United States Patent
Okada et al.

(10) Patent No.: US 10,442,948 B2
(45) Date of Patent: *Oct. 15, 2019

(54) NEAR-INFRARED ABSORBING FINE PARTICLE DISPERSION LIQUID AND METHOD FOR PRODUCING THE SAME

(71) Applicant: SUMITOMO METAL MINING CO., LTD., Tokyo (JP)

(72) Inventors: Mika Okada, Isa (JP); Hideaki Fukuyama, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 86 days.

This patent is subject to a terminal disclaimer.

(21) Appl. No.: 15/546,964

(22) PCT Filed: Jan. 27, 2016

(86) PCT No.: PCT/JP2016/052402
§ 371 (c)(1),
(2) Date: Jul. 27, 2017

(87) PCT Pub. No.: WO2016/121844
PCT Pub. Date: Aug. 4, 2016

(65) Prior Publication Data
US 2018/0016459 A1    Jan. 18, 2018

(30) Foreign Application Priority Data
Jan. 27, 2015 (JP) .................. 2015-013421

(51) Int. Cl.
*C09D 17/00* (2006.01)
*C09C 1/02* (2006.01)
(Continued)

(52) U.S. Cl.
CPC .......... *C09D 17/007* (2013.01); *C09D 17/00* (2013.01); *C09K 3/00* (2013.01); *C09D 11/037* (2013.01); *C09D 11/50* (2013.01)

(58) Field of Classification Search
CPC ....... C09C 1/02; C09D 11/033; C09D 11/037; C09D 11/50; C09D 17/007;
(Continued)

(56) References Cited

U.S. PATENT DOCUMENTS

| 8,268,957 B2* | 9/2012 | Liu .................. C08G 73/00 |
| 2006/0178254 A1* | 8/2006 | Takeda ............... C09D 11/037 |

(Continued)

FOREIGN PATENT DOCUMENTS

| EP | 1801815 A1 | 6/2007 |
| JP | H04-320466 | 11/1992 |

(Continued)

OTHER PUBLICATIONS

Apr. 26, 2016 Written Opinion issued in International Patent Application No. PCT/JP2016/052402.
(Continued)

*Primary Examiner* — Bijan Ahvazi
(74) *Attorney, Agent, or Firm* — Oliff PLC

(57) ABSTRACT

Provided is a near infrared absorbing fine particle dispersion liquid, which can be applied to offset printing, including: a solvent of one or more kinds selected from vegetable oils and vegetable oil-derived compounds; near infrared absorbing fine particles of one or more kinds selected from 10 mass % more and 25 mass % or less of a composite tungsten oxide expressed by $M_xW_yO_z$, and/or a tungsten oxide having a Magneli phase expressed by a general formula $W_yO_z$; and a dispersant soluble in the solvent and having a fatty acid in its structure, wherein a viscosity is 180 mPa/S or less.

8 Claims, 7 Drawing Sheets

(51) Int. Cl.
*C09K 3/00* (2006.01)
*C09D 11/037* (2014.01)
*C09D 11/50* (2014.01)

(58) Field of Classification Search
CPC .............. C01P 2002/76; C01P 2002/77; C01P 2004/62; C01P 2004/64; C01P 2004/80; C09K 3/00
See application file for complete search history.

(56) References Cited

U.S. PATENT DOCUMENTS

| | | |
|---|---|---|
| 2009/0116100 A1 | 5/2009 | Ota et al. |
| 2011/0272646 A1 | 11/2011 | Meyer |
| 2018/0016451 A1* | 1/2018 | Okada ................. C09D 11/037 |

FOREIGN PATENT DOCUMENTS

| | | |
|---|---|---|
| JP | 2000-309736 A | 11/2000 |
| JP | 2006-143778 A | 6/2006 |
| JP | 2008-291167 A | 12/2008 |
| JP | 4626284 B2 | 2/2011 |
| JP | 2013-112791 A | 6/2013 |
| JP | 2013-526625 A | 6/2013 |
| JP | 2015-117353 A | 6/2015 |
| WO | 2005/037932 A1 | 4/2005 |
| WO | 2012/128332 A1 | 9/2012 |

OTHER PUBLICATIONS

Apr. 26, 2016 Search Report issued in International Patent Application No. PCT/JP2016/052402.
Jun. 6, 2018 Extended European Search Report issued in European Patent Application No. 16743447.1.

* cited by examiner

NEAR-INFRARED ABSORBING FINE PARTICLE DISPERSION LIQUID AND METHOD FOR PRODUCING THE SAME

TECHNICAL FIELD

The present invention relates to a near infrared absorbing fine particle dispersion liquid having an absorption ability in a near infrared region and applicable to offset printing and a method for producing the same. The "near infrared absorbing fine particles" in the present invention and the "near infrared absorbing material fine particles" in the prior application based on the priority right are the same fine particles.

DESCRIPTION OF RELATED ART

There are various kinds of printing technologies depending on the purpose of use and the like. Among them, offset printing is capable of high-precision printing and has characteristics that it is suitable for mass printing. In the offset printing, a dispersion liquid of a pigment used from its printing principle is lipophilic, and in the offset printing, it is required to have a property of not dissolving a rubber blanket to which a printing ink containing the dispersion liquid is transferred.

On the other hand, in recent years, for example, for the purpose of preventing counterfeiting or the like, it is considered that data is printed on various tickets and certificates, etc., by using a pigment in which an infrared absorbing material is used, and various information management is performed by reading the data using an infrared judgment device or the like.

In such an application, a lot of data is printed on a large amount of paper medium, and therefore it is considered to use the offset printing as a printing method.

Further, when an infrared absorbing material is transparent in a visible light region, it can not be determined in appearance that the infrared absorbing material is printed as a pigment. This is preferable from a viewpoint of anti-counterfeiting and the like and does not visually obstruct art original printed display, and therefore this is also preferable from a viewpoint of visibility and beautiful appearance.

As an example using the infrared absorbing material, for example, Patent Document 1 proposes an example using a phthalocyanine compound.

Further, Patent Document 2 proposes an example using tin-doped indium oxide.

Inventors of the present invention disclose composite tungsten oxide fine particles expressed by a general formula $M_xW_yO_z$ (M is an element of one or more kinds selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x/y \leq 1$, and $2.2 \leq z/y \leq 3.0$) fine particles, and a magneli phase expressed by the general formula $W_yO_z$ (W is tungsten, O is oxygen, satisfying $2.45 \leq z/y \leq 2.999$) fine particles, and which is a material having a high visible light transmittance and a near infrared absorbing function.

[Patent Document 1] Japanese Patent Laid-Open Publication No. 1992-320466
[Patent Document 2] Japanese Patent Laid-Open Publication No. 2000-309736
[Patent Document 3] Japanese Patent Publication No. 4626284

SUMMARY OF THE INVENTION

Problem to be Solved by the Invention

According to studies by inventors of the present invention, an organic pigment such as a phthalocyanine compound used in Patent Document 1, involves a problem that its infrared absorption property is changed due to an influence of temperature, ultraviolet rays, and the like, resulting in poor durability.

Further, the infrared absorbing material using tin-doped indium oxide used in Patent Document 2, involves a problem that reading accuracy of a printing unit and the like are deteriorated because contrast is insufficient in a wavelength region in which light is transmitted and reflected as a visible light and in a wavelength region in which light is absorbed as an infrared light.

In contrast, the near infrared absorbing fine particles described in Patent Document 3, are dispersed in an organic solvent such as toluene, and therefore there is a possibility that it dissolves a rubber blanket and cannot be used for the offset printing.

Therefore, the inventors of the present invention attempt to add and disperse the near infrared absorbing fine particles called composite tungsten oxide fine particles expressed by a general formula $M_xW_yO_z$ or tungsten oxide fine particles having a magnetized phase expressed by a general formula $W_yO_z$, in vegetable oils and vegetable oil-derived compounds used as solvents for the offset printing. However, it is also found that a viscosity of the dispersion liquid is increased and it is difficult to pulverize the near infrared absorbing fine particles or disperse it in the solvent.

Under such a circumstance, the present invention is provided, and an object of the present invention is to provide a near infrared absorbing fine particle dispersion liquid having an absorption ability in the near infrared region and can be applied to the offset printing with clear contrast, and a method for producing the same.

Means for Solving the Problem

In order to solve the abovementioned problem, as a result of intensive research by the inventors of the present invention, it is found that when 10 mass % or more and 25 mass % or less of the near infrared absorbing fine particles are added to a solvent of one or more kinds selected from vegetable oils or vegetable oil-derived compounds, and pulverized and dispersed, the near infrared absorbing fine particles are sufficiently pulverized and dispersed by setting the viscosity of the dispersion liquid to 180 mPa/S or less, and a near infrared absorbing fine particle dispersion liquid that can be applied to the offset printing is obtained. Thus, the present invention is completed. Then, it is also found that by adding a predetermined dispersant to the dispersion liquid, the viscosity of the dispersion liquid can be kept at 180 mPa/S or less.

Namely, in order to solve the abovementioned problem, according to a first invention, there is provided a near infrared absorbing fine particle dispersion liquid, including:
a solvent of one or more kinds selected from vegetable oils and vegetable oil-derived compounds;
near infrared absorbing fine particles of one or more kinds selected from 10 mass % more and 25 mass % or less of a composite tungsten oxide expressed by $M_xW_yO_z$ (M is an element of one or more kinds selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x/y \leq 1$, and $2.2 \leq z/y \leq 3.0$), or tungsten oxide having a Magneli phase expressed by a general formula $W_yO_z$ (W is tungsten, O is oxygen, satisfying $2.45 \leq z/y \leq 2.999$); and a dispersant soluble in the solvent and having a fatty acid in its structure, wherein a viscosity is 180 mPa/S or less.

According to a second invention, there is provided the near infrared absorbing fine particle dispersion liquid of the first invention, wherein an anchor portion of the dispersant has one or more kinds selected from a secondary amino group, a tertiary amino group, and a quaternary ammonium group.

According to a third invention, there is provided the near infrared absorbing fine particle dispersion liquid of the first or second invention, wherein the dispersant has an acid value of 1 mg KOH/g or more.

According to a fourth invention, there is provided the near infrared absorbing fine particle dispersion liquid of any one of the first to third inventions, wherein a dispersed particle size of each near infrared absorbing fine particle is 1 nm or more and 200 nm or less.

According to a fifth invention, there is provided the near infrared absorbing fine particle dispersion liquid of any one of the first to fourth inventions, wherein the near infrared ray absorbing fine particles expressed by MxWyOz have a hexagonal crystal structure or composed of a hexagonal crystal structure.

According to a sixth invention, there is provided the near infrared absorbing fine particle dispersion liquid of any one of the first to fifth inventions, wherein a lattice constant of the near infrared absorbing fine particles expressed by $M_xW_yO_z$ is 0.74060 nm or more and 0.74082 nm or less on the a-axis and 0.76106 nm or more and 0.76149 nm or less on the c-axis.

According to a seventh invention, there is provided the near infrared absorbing fine particle dispersion liquid of any one of the first to sixth inventions, wherein a surface of each near infrared absorbing fine particle is coated with a compound of one kind or more selected from Si, Ti, Al and Zr.

According to an eighth invention, there is provided the near infrared absorbing fine particle dispersion liquid of any one of the first to seventh inventions, wherein the vegetable oil is one or more kinds selected from drying oils and semi-drying oils.

According to a ninth invention, there is provided a method for producing the near infrared absorbing fine particle dispersion liquid of any one of the first to eighth inventions, including:

mixing the near-infrared absorbing fine particles, the solvent and the dispersant; and dispersing the mixture in a wet medium mill.

Advantage of the Invention

The near infrared absorbing fine particle dispersion liquid of the present invention can be easily applied to the offset printing having an absorption ability in the near infrared region and having a clear contrast.

DETAILED DESCRIPTION OF THE INVENTION

Figure 1:
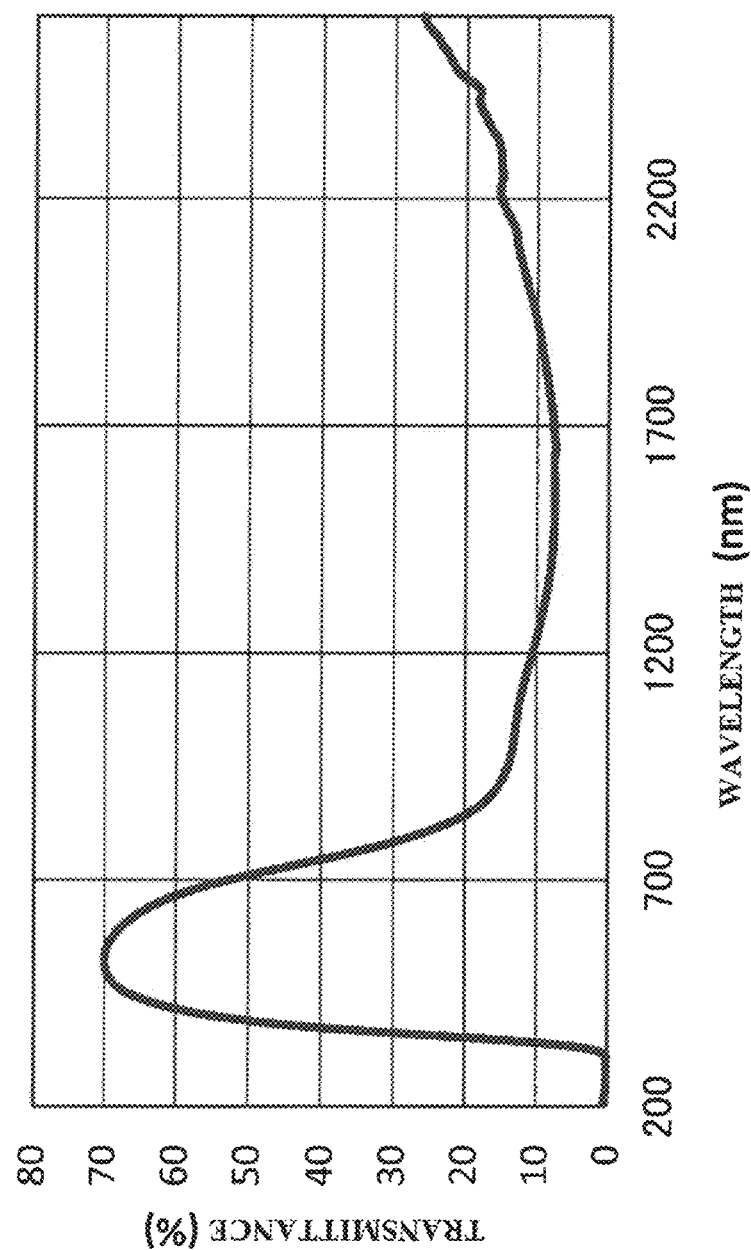
FIG. 1 is a light transmission profile of a dried film of a dispersion liquid A according to the present invention.

A mode for carrying out the present invention will be described in detail in an order of near infrared absorbing fine particles, a solvent, a dispersant, a method for dispersing the near infrared ray absorbing fine particles in the solvent, and a near infrared absorbing fine particle dispersion liquid.

1. Near Infrared Absorbing Fine Particles

The near infrared absorbing fine particles used in the present invention are one or more kinds selected from a composite tungsten oxide expressed by $M_xW_yO_z$ (M is an element of one or more kinds selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Ti, Nb, V, Mo, Ta, Re, Be, Hf, Os, Bi, and I, W is tungsten, O is oxygen, satisfying $0.001 \leq x/y \leq 1$, and $2.2 \leq z/y \leq 3.0$), or a tungsten oxide having a Magneli phase expressed by a general formula $W_yO_z$ (W is tungsten, O is oxygen, satisfying $2.45 \leq z/y \leq 2.999$).

Alkali metals are elements of Group 1 of a periodic table excluding hydrogen, alkaline earth metals are elements of Group 2 of the periodic table, rare earth elements are Sc, Y and lanthanoid elements.

In a case of the composite tungsten oxide expressed by $M_xW_yO_z$, element M is added in the near infrared absorbing fine particles used in the present invention. Therefore, free electrons are generated including a case of z/y=3.0, and an absorption property caused by free electrons are developed in a near infrared region, and such near infrared absorbing fine particles are effective as a near-infrared absorbing material in the vicinity of a wavelength of 1000 nm.

Particularly, from a viewpoint of improving optical properties and a weather resistance as a near infrared absorbing material, the element M is preferably one kind or more of Cs, Rh, K, Ti, In, Ba, Li, Ca, Sr, Fe and Sn, and the element M is further preferably Cs.

Further, in a case of $Cs_xW_yO_z$ ($0.25 \leq x/y \leq 0.35$, $2.2 \leq z/y \leq 3.0$), a lattice constant is preferably 0.74060 nm or more and 0.74082 nm or less on the a-axis and 0.76106 nm or more and 0.76149 nm or less on the c-axis. When the lattice constant is within the above range, near infrared absorbing fine particles having particularly excellent optical properties and weather resistance can be obtained. The lattice constant can be obtained by conducting Rietveld analysis based on the data of an XRD pattern, for example.

Further, it is also preferable that the composite tungsten oxide is treated with a silane coupling agent. This is because excellent dispersibility can be obtained and an excellent near infrared absorbing function and transparency in the visible light region can be obtained.

When the value of x/y indicating an added amount of the element M is larger than 0.001, a sufficient amount of free electrons is generated and a near-infrared absorption effect can be sufficiently obtained. As the added amount of the element M is increased, a supply amount of free electrons is increased and the near infrared absorption effect is also increased, but is saturated when the value of x/y is about 1. When the value of x/y is smaller than 1, formation of an impurity phase in a fine particle-containing layer can be avoided, which is preferable.

Next, the value of z/y indicating control of an oxygen amount is preferably $2.2 \leq z/y \leq 3.0$, and more preferably $2.45 \leq z/y \leq 3.0$, because even in the composite tungsten oxide expressed by $M_xW_yO_z$, the same mechanism works as the abovementioned tungsten oxide expressed by $W_yO_z$, and in addition, there is a supply of free electrons by adding the abovementioned element M even in a case of z/y=3.0.

There is a case that the composite tungsten oxide or a part of oxygen atoms constituting the composite tungsten oxide is replaced with a halogen atom, which is derived from the composite tungsten oxide of the present invention or a raw material compound used for producing the tungsten oxide. However, there is no problem in implementing the present invention. Therefore, the composite tungsten oxide and the tungsten oxide of the present invention include a case that part of the oxygen atom is replaced with a halogen atom.

Further, when each composite tungsten oxide fine particle which is a near infrared absorbing fine particle has a hexagonal crystal structure, transmission of the fine particles in the visible light region is improved and absorption in the near infrared region is improved.

When cations of the element M are added and present in hexagonal voids, the transmission in the visible light region is improved and the absorption in the near infrared region is improved. Generally, when the element M having a large ionic radius is added, the hexagonal crystal is formed, and specifically, when Cs, K, Rb, Tl, In, Ba, Sn, Li, Ca, Sr, and Fe are added, the hexagonal crystal is likely to be formed. Of course, It is preferable that the added element M is present in hexagonal voids formed by $WO_6$ units, and the added element is not limited to the abovementioned elements.

When the composite tungsten oxide fine particle having the hexagonal crystal structure have a uniform crystal structure, the added amount of the additional element M is preferably from 0.2 to 0.5, more preferably from 0.30 to 0.35, and ideally 0.33 in terms of x/y. When the value of x/y is 0.33, it is considered that the additional element M is arranged in all of the hexagonal voids.

Further, tetragonal, cubic tungsten bronze also has the near infrared absorption effect, other than the hexagonal crystal. Then, due to these crystal structures, an absorption position in the near infrared region is likely to change, and the absorption position is likely to move to a long wavelength side in an order of cubic<tetragonal<hexagonal crystals. Accordingly, absorption in the visible light region is small in an order of hexagonal<tetragonal<cubic crystals. Therefore, hexagonal tungsten bronze is preferably used for applications in which light in the visible light region is transmitted and light in the near infrared region is absorbed.

Next, in the tungsten oxide expressed as $W_yO_z$, the so-called "Magneli phase" having a composition ratio expressed by $2.45 \leq z/y \leq 2.999$ is chemically stable, and the absorption property in the near infrared region is good, and therefore such tungsten oxide is preferable as the near infrared absorbing material.

The near infrared absorbing fine particles of the present invention largely absorb a light in the near infrared region, particularly around the wavelength of 1000 nm, and therefore a transmission color tone is blue to green in many cases.

Further, the dispersed particle size of each fine particle of the near infrared absorbing material can be selected depending on the intended use. First, when used for applications of maintaining transparency, each fine particle of the near infrared absorbing material preferably has a dispersed particle size of 2000 nm or less. This is because when the dispersed particle size is 2000 nm or less, a difference between the peak of the transmittance and the bottom of the absorption in the near infrared region becomes large, and the effect as the near infrared absorbing material having transparency in the visible light region can be exhibited. Further, fine particles having a dispersed particle size smaller than 2000 nm do not completely shield a light by scattering, and visibility in the visible light region is maintained, and simultaneously, transparency can be maintained efficiently.

Further, when transparency is emphasized in the visible light region, preferably scattering of fine particles is taken into consideration. Specifically, the dispersed particle size of the near infrared absorbing fine particle is preferably 200 nm or less, and more preferably 100 nm or less. The reason is that scattering of light in the visible light region in a wavelength range of 400 nm to 780 nm due to geometric scattering or Mie scattering is reduced if the dispersed particle size is small, and as a result, it is possible to avoid a situation that the near infrared absorbing film becomes like a frosted glass and clear transparency cannot be obtained. Namely, when the dispersed particle size of the near infrared absorbing fine particle is 200 nm or less, the geometric scattering or the Mie scattering is reduced and the region becomes a Rayleigh scattering region. This is because in the Rayleigh scattering region, a scattered light is reduced in inverse proportion to the sixth power of the dispersed particle size, and therefore scattering is reduced as the dispersed particle size is decreased and the transparency is improved. Further, when the dispersed particle size is 100 nm or less, the scattered light is extremely reduced, which is preferable. From a viewpoint of avoiding scattering of light, it is preferable that the dispersed particle size is small, Meanwhile, when the dispersed particle size is 1 nm or more, industrial production is facilitated.

Further, the fact that the surface of the fine particle constituting the near infrared absorbing material of the present invention is covered with an oxide containing one or more kinds of Si, Ti, Zr and Al, is preferable from a viewpoint of improving the weather resistance of the near infrared absorbing material.

2. A Solvent

The solvent used in the present invention is required to be water-insoluble and not dissolve the rubber blanket used in the offset printing, Specifically, the solvent composed of one or more kinds selected from the vegetable oils and the vegetable oil-derived compounds is used.

As vegetable oils, drying oil such as linseed oil, sunflower oil, tung oil, semi-drying oils such as sesame oil, cottonseed oil, rapeseed oil, soybean oil, rice bran oil, and non-drying oils such as olive oil, coconut oil, palm oil, dehydrated castor oil, are used. As the compound derived from a vegetable oil, fatty acid monoesters obtained by direct esterification of vegetable oil fatty acids and monoalcohols and ethers, etc., are used.

The abovementioned vegetable oils and vegetable oil-derived compounds have a double bond in the fatty acid of the fat or oil which is a constituent component. The double bond reacts with oxygen in the air, whereby the polymerization reaction between the double bonds proceeds. A coating film after offset printing is solidified, through a bonding process by a polymerization reaction of molecules of oil or by a polymerization reaction of molecules of oil and pigment components for offset printing.

The solidification becomes faster as the double bonds are increased in the fatty acid, and the double bond in the fatty acid is evaluated by iodine value. Namely, the solidification of the vegetable oil and the vegetable oil-derived compounds is accelerated as the iodine value is increased. Specifically, the iodine value is 130 or more in the drying oil, 130 to 100 in the semidrying oil, and 100 or less in the non-drying oil. Then, one or more selected from semi-drying oil, drying oil such as linseed oil, sunflower oil, Lung oil and the like having an iodine value of 130 or more, is preferable as the vegetable oil and the vegetable oil-derived. compound used in the offset printing.

3. A Dispersant

The dispersant for dispersing the near infrared absorbing fine particles in the solvent is preferably one having a structure of a fatty acid. Further, the dispersant is required to be soluble in the solvent of the present invention described above.

Further, the structure of the dispersant is not particularly limited, and it is preferable to have a polylactone skeleton or hydroxystearic acid chain. Further, as a dispersant having one or more kinds selected from a secondary amino group, a tertiary amino group and a quaternary ammonium group as an anchor portion described later, an ability to disperse the infrared absorbing fine particles of the present invention in the solvent of the present invention is high, which is preferable.

Further, when the acid value of the dispersant of the present invention is 1 mg KOH/g or more, the ability to disperse the abovementioned infrared absorbing fine particles is high, which is preferable.

In the present invention, the anchor portion is a potion in a molecule constituting the dispersant and is a portion which adsorbs on the surface of the near infrared absorbing fine particle or a pigment.

Then, it is preferable to use a polymer dispersant having a basic anchor portion as the dispersant of the present invention. This is because by using particularly the polymer dispersant having the basic anchor portion, storage stability of an ink to be produced is improved, which is preferable.

Figure 5:
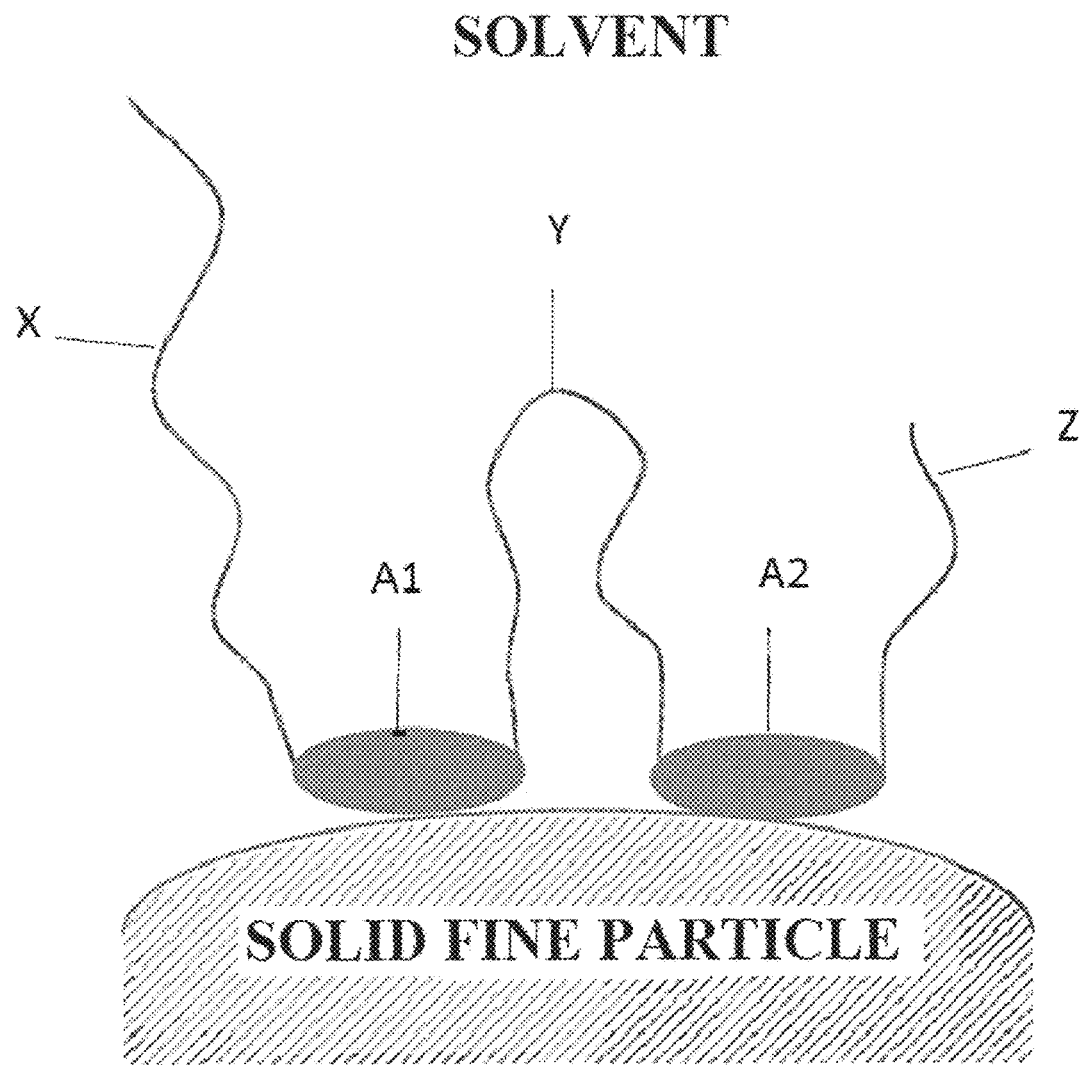
FIG. 5 is a schematic view of a dispersant according to the present invention.

An aspect of the polymer dispersant used in the present invention is shown in FIG. 5. As shown in FIG. 5, in the general formula [X-A1-Y-A2-Z], A1 and A2 are portions (anchor portions) which are adsorbed on solid fine particles. In the anchor portion, its structure is not particularly limited as long as it has at least one point (adsorption point) to be adsorbed on each solid fine particle, and has a chain, cyclic, or fused polycyclic shape, or a combination thereof for example. Further, A1 and A2 may be the same or different. On the other hand, X, Y and Z are polymer chain portions which are solivated, and solved and spread out from the surface of the solid fine particle into a liquid, and hereinafter, X and Z are referred to as tail portions and Y is referred to as a loop portion. In the tail portions and the loop portion, a homopolymer composed of a single monomer and a copolymer composed of plural monomers are used.

Further, as the polymer dispersant used in the present invention, a substance having no loop portion (Y) in the general formula [X-A1-Y-A2-Z], can be used, which is synonymous with the general formula [X-A1-A2-Z].

Figure 6:
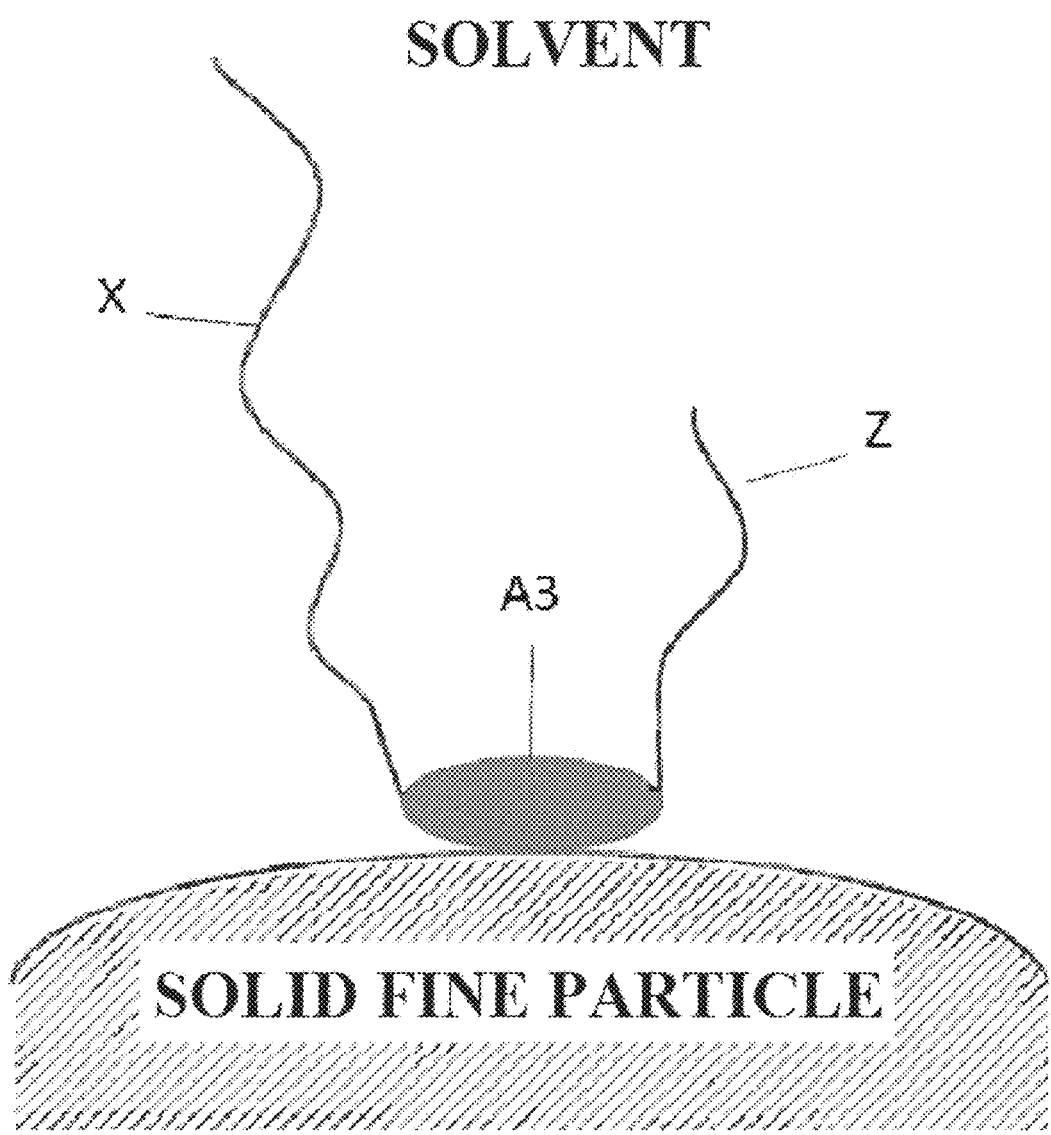
FIG. 6 is schematic view of a dispersant according to different aspect of the present invention.

Still further, as an aspect of the polymer dispersant used in the present invention, there is also a structure in which Y shown in FIG. 6 does not exist and two tail portions (X, Z) are bonded to one anchor portion (A3). In this case, the general formula is [X-A3-Z].

Figure 7:
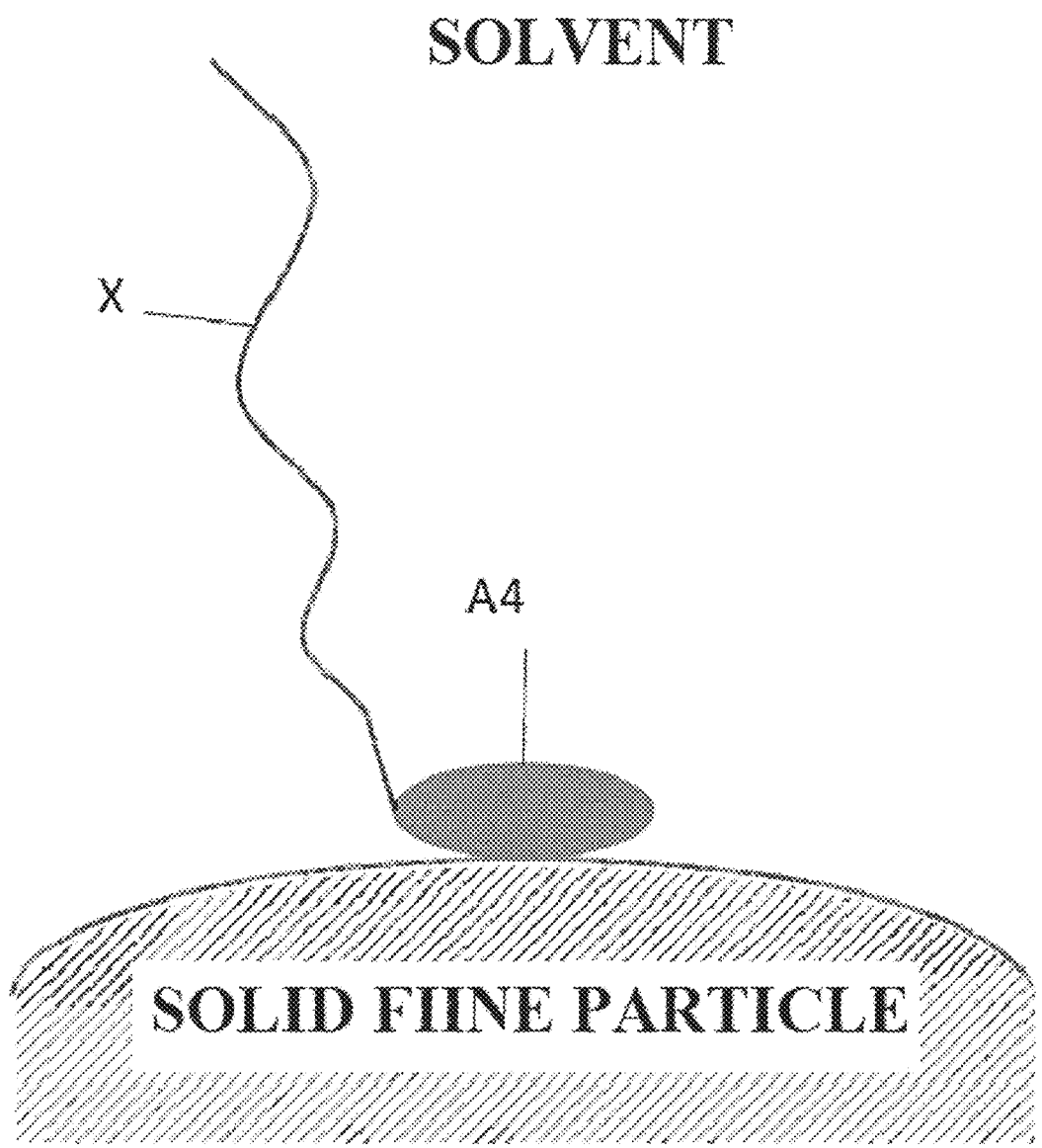
FIG. 7 is a schematic view of a dispersant according to still another aspect of the present invention.

In addition, as an aspect of the dispersant of the present invention, it is also possible to use the dispersant having no tail portion (Z) and having one tail portion (X) bonded to one anchor portion (A4) as shown in FIG. 7. In this case, the general formula is [X-A4].

A1, A2, A3, A4 constituting the dispersant according to the present invention, have at least one functional group (adsorption point) that exerts adsorption interaction with the surface of the solid fine particle by hydrogen bonding, acid/base interaction, or the like. Further, as described above, A1 and A2 may be the same as each other or may be different from each other, A1 and A2 having the same functional group as the functional group (adsorption point) that exerts adsorption interaction are preferable, in consideration of the adsorptivity of the solid fine particles to the surface. Further, it is preferable that A1 and A2 are the same from a viewpoint of the ease of producing the polymer dispersant.

The molecular chains X, Y and Z constituting the dispersant of the present invention may be composed of different chemical species and at least two of them may be composed of the same chemical species. The tail portion (X, Z) and the loop portion (Y) of the molecular chain are portions which are solvated and spread from the surface of the solid fine particle to be dissolved in the solvent, and therefore a molecular chain having an affinity with the solvent is used.

The dispersant of the present invention exhibits a dispersion ability enabling the viscosity of the dispersion liquid to be maintained at 180 mPa/S or less, when 10 mass % or more and 25 mass % or less of the composite tungsten oxide and/or tungsten oxide of the present invention are added to the solvent composed of one or more petroleum solvents, which is then dispersed to obtain a dispersion liquid.

The reason is as follows. As a result of maintaining the viscosity of the dispersion at 180 mPa/S or less, pulverization and dispersion proceed sufficiently in the composite tungsten oxide fine particles and/or the tungsten oxide. Then, in the produced near infrared absorbing fine particle dispersion liquid, the dispersed particle size of the composite tungsten oxide and/or the tungsten oxide can be made 200 nm or less.

Specific examples of preferable dispersants include commercially available dispersants such as: DISPERBYK 142; Disperbyk 160, Disperbyk 161, Disperbyk 162, Disperbyk 163, Disperbyk 166, Disperbyk 170, Disperbyk 180, Disperbyk 182, Disperbyk 184, Disperbyk 190, Disperbyk 2155 (All manufactured by BYK Japan K.K.); EFKA-46, EFKA-47, EFKA-48, EFKA-49 (all manufactured by BASF); Polymer 100, polymer 120, polymer 150, polymer 400, polymer 401, polymer 402, polymer 403, polymer 450, polymer 451, polymer 452, polymer 453 (all manufactured by EFKA Chemical Co.); SOLSPERSE 11200, Solsperse 13940, Solsperse 16000, Solsperse 17000, Solsperse 18000, Solsperse 20000, Solsperse 24000, Solsperse 27000, Solsperse 28000, Solsperse 32000, Solsperse 33000, Solsperse 39000, Solsperse 56000, Solsperse 71000 (all manufactured by Lubrizol Japan Ltd.); Solplus D 530, Solplus DP 320, Solplus L 300, Solplus K 500, Solplus R 700 (all manufactured by Lubrizol Japan Ltd.); Ajisper PB 711, Ajisper PA 111, Ajisper PB 811, Ajisper PW 911 (all manufactured by Ajinomoto Co., Ltd.); and Floren DOPA-15, Floren DOPA-22, Floren DOPA-17, Floren TG-730 W, Floren G-700, Floren TG-720 W (all manufactured by Kyoeisha Chemical Industry Co., Ltd.).

The addition amount of the dispersant of the present invention is preferably 30 parts by weight or more and 200 parts by weight or less based on 100 parts by weight of the near infrared absorbing fine particles.

Further, in a case of using a commercially available dispersant, it is preferable that the dispersant does not contain a solvent that may dissolve acrylic resin or the like. Accordingly, a nonvolatile content (after heating at 180° C. for 20 minutes) of the dispersant is preferably high, for example, preferably 95% or more.

4. A method for Dispersing the Near Infrared Absorbing Fine Particles in the Solvent In the dispersion method for obtaining the near infrared absorbing fine particle dispersion liquid by dispersing the near infrared absorbing fine particles of the present invention in the solvent of the present invention, can be arbitrarily selected as long as this is a method for evenly dispersing the fine particles in the solvent. Specifically, it is preferable to use a wet medium mill such as a bead mill or a ball mill.

The concentration of the near infrared absorbing fine particles in the near-infrared absorbing fine particle dispersion liquid of the present invention is 10 to 25 mass %, preferably 15 to 25 mass %, and more preferably 20 to 25 mass %.

The higher the concentration of the near infrared absorbing fine particles is, the easier it is to adjust the coating liquid, which is preferable. In contrast, when the concentration of the near infrared absorbing fine particles is 25 mass % or less, the infrared absorbing fine particles can be pulverized and dispersed sufficiently by suppressing the viscosity of the obtained near infrared ray absorbing fine particle dispersion liquid to 180 mPa/S or less by adding the abovementioned dispersant of the present invention. In this case, the dispersed particle size of the near infrared absorbing fine particles can be arbitrarily controlled by the treatment time of the wet medium mill. For example, by increasing the treatment time, the dispersed particle size can be made small.

A lower limit of the viscosity of the near infrared absorbing fine particle dispersion liquid of the present invention depends on the viscosity of the vegetable oil or the vegetable oil-derived compounds to be used. For example, the viscosity (24° C.) of sunflower oil is 50 mPa/S and the viscosity of linseed oil (24° C.) is 40 mPa/S.

By the production method described above, the near infrared absorbing fine particle dispersion liquid of the present invention is obtained.

EXAMPLE

Hereinafter, the present invention will be specifically described with reference to examples, but the present invention is not limited to these examples.

The acid value of the dispersant of this example is measured by a potentiometric titration method in accordance with JIS K 0070.

The method of measuring the viscosity of the near infrared absorbing fine particle dispersion liquid of this example was measured using a vibration type viscometer VM 100 A-L (manufactured by CBC Materials Co., Ltd.).

On the other hand, the optical properties of the near infrared absorbing film of this example were measured using a spectrophotometer U-4000 (manufactured by Hitachi, Ltd.) in accordance with TIS R 3106.

Example 1

23 mass % of hexagonal $Cs_{0.33}WO_3$ (a-axis: 0.74075 nm, c-axis: 0.76127 nm) which is a composite tungsten oxide as near infrared absorbing fine particles, and 11.5 mass % of a dispersant having a fatty acid and an amino group in its structure, having an acid value of 20.3 mg KOH/g, having a hydroxystearic acid chain, and having a nonvolatile content of 100% (hereinafter abbreviated as dispersant "a"), and 65.5% of sunflower oil as a solvent, were weighed.

These near infrared ray absorbing fine particles, dispersing agent and solvent were charged in a paint shaker containing 0.3 mmφ $ZrO_2$ beads, pulverized and dispersed for 40 hours, to thereby obtain an infrared absorbing fine particle dispersion liquid (abbreviated as dispersion A hereafter) of example 1.

The dispersed particle size of the composite tungsten oxide fine particles in the dispersion liquid A was measured with a particle size distribution meter (manufactured by Otsuka Electronics Co., Ltd.) and it was found to be 81 nm, and the viscosity (24° C.) of the dispersion liquid A was 96.2 mPa/S.

The results are shown in table 1 (hereinafter, the same is applied to examples 2 to 4, and comparative example 1).

A transparent PET film having a thickness of 50 μm was prepared as a substrate to be printed, and a dispersion liquid A was applied to the surface thereof with a bar coater to a thickness of 8 μm. This film was dried at 70° C. for 3 hours to thereby dry the dispersion liquid A.

The visible light transmittance of the obtained dried film of the dispersion liquid A was 68.8%. Further, the transmittance of a light having a wavelength of 550 nm which was a visible light region was 69.8%, the transmittance of a light having a wavelength of 800 nm was 26.7%, the transmittance of a light having a wavelength of 900 nm was 15.7%, the transmittance of a light having a wavelength of 1000 nm was 13.3%, and the transmittance of a light having a wavelength of 1500 nm was 7.5% in a near infrared region. The light transmission profile of the dried film of this dispersion liquid A is shown in FIG. 1 (examples 2 to 4 are similarly shown hereafter).

Example 2

In the same manner as in example 1 except that linseed oil was used as a solvent, a near infrared absorbing fine particle dispersion liquid (abbreviated as a dispersion B hereafter) of example 2 was obtained.

The dispersed particle size of the composite tungsten oxide fine particles in the dispersion liquid B was measured with a particle size distribution meter manufactured by Otsuka Electronics Co., and it was found to be 79 nm, and the viscosity (24° C.) of the dispersion B was found to be 91.4 mPa/S.

Figure 2:
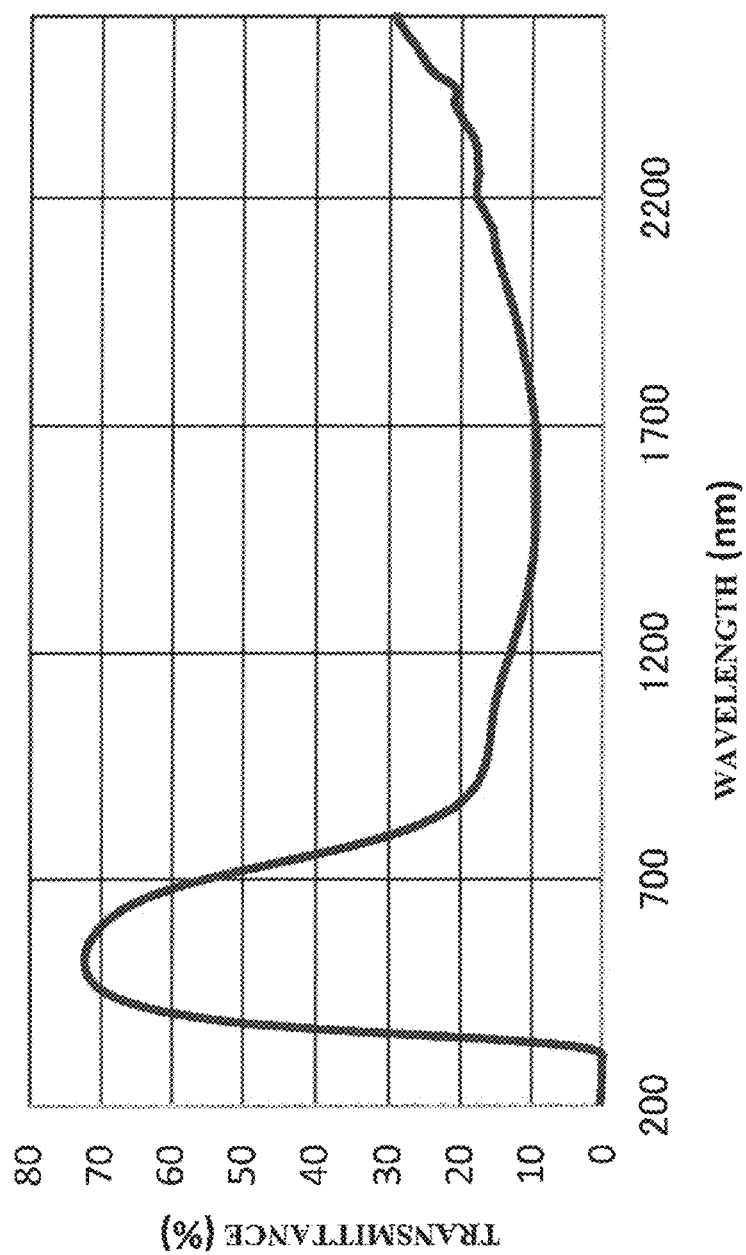
FIG. 2 is a light transmission profile of a dried film of a dispersion liquid B according to the present invention.

Next, in the same manner as in example 1, a dried film of example 2 was obtained and the optical properties were measured. FIG. 2 is a light transmission profile of the dried film of the dispersion liquid B.

Example 3

In the same manner as in example 1 except that the dispersant having a fatty acid and an amino group in its structure, having an acid value of 5 mg KOH/g or more, having a hydroxystearic acid structure partially modified with caprolactone, and having a nonvolatile content of 100% (abbreviated as a dispersant "b" hereafter) was used, a near-infrared absorbing fine particle dispersion liquid (abbreviated as a dispersion liquid C hereafter) of example 3 was obtained.

The dispersed particle size of the composite tungsten oxide fine particles in the dispersion liquid C was measured with a particle size distribution meter manufactured by Otsuka Electronics Co., and it was found to be 80 nm, and the viscosity (24° C.) of the dispersion liquid C was 151 mPa/S.

Figure 3:
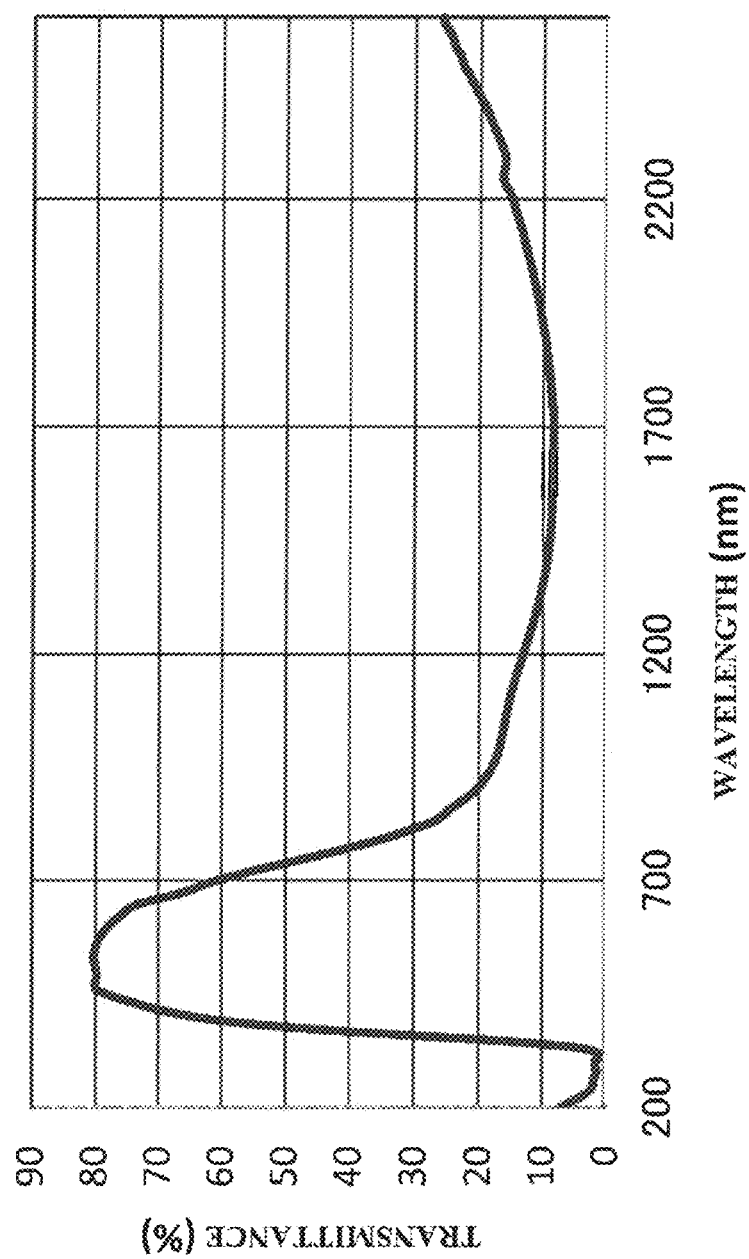
FIG. 3 is a light transmission profile of a dried film of a dispersion liquid C according to the present invention.

Next, a dried film of example 3 was obtained in the same manner as in example 1, and the optical properties were measured. FIG. 3 is a light transmission profile of the dried film of the dispersion liquid C.

Example 4

In the same manner as in example 1 except that a dispersant having a fatty acid and an amino group in its structure, having an acid value of 20.3±5 mg KOH/g, having a polylactone structure, and having a nonvolatile content of 100% (hereinafter abbreviated as dispersant c) was used, a near-infrared absorbing fine particle dispersion liquid (abbreviated as a dispersion liquid D hereafter) of example 4 was obtained.

The dispersed particle size of the composite tungsten oxide fine particles in the dispersion liquid D was measured with a particle size distribution meter manufactured by Otsuka Electronics Co., Ltd., and it was found to be 79 nm, and the viscosity (24° C.) of the dispersion liquid D was 112 mPa/S.

to thereby obtain a composite tungsten oxide fine particle dispersion liquid (abbreviated as a dispersion liquid E hereafter).

The dispersed particle size of the tungsten oxide fine particles in the dispersion liquid E was measured with a particle size distribution meter (manufactured by Otsuka Electronics Co., Ltd.), and it was found to be 77 nm, and the viscosity (24° C.) of the dispersion liquid D was 6.2 mPa/S.

Evaluation of Examples 1 to 4 and Comparative Examples 1

In examples 1 to 4, the dried film prepared from a near infrared absorbing fine particle dispersion liquid in which particles of tungsten oxide or composite tungsten oxide are dispersed in the vegetable oil, exhibits high transmittance in the visible light region and remarkably low transmittance in the near infrared region.

From this result, it is found that a printing pattern can be discriminated between the printing pattern of the offset printing ink prepared using the near infrared absorbing fine particle dispersion liquid of the present invention, and the printing pattern of other ink material, using a near infrared ray identifying machine.

On the other hand, the dispersion liquid E of comparative example 1 contains toluene and dissolves a rubber blanket during offset printing, and therefore it was considered that application to offset printing was unsuitable.

TABLE 1

| | | Raw material | | | | | A * | | | Optical property | | | | | |
|---|---|---|---|---|---|---|---|---|---|---|---|---|---|---|---|
| | | | Dispersant | | | | | | | | Transmittance in each wavelength | | | | |
| | Solvent | CWO content (Mass %) | Kind | Acid value (mgKOH/g) | Content (Mass %) | B * 24° C. (g/cm³) | C* (nm) | Viscosity 24° C. (mPa · S) | D * (%) | 550 nm (%) | 800 nm (%) | 900 nm (%) | 1000 nm (%) | 1500 nm (%) |
|---|---|---|---|---|---|---|---|---|---|---|---|---|---|---|
| Example1 | E* | 23 | a | 20.3 | 11.5 | 1.15 | 81 | 96.2 | 68.8 | 69.8 | 26.7 | 15.7 | 13.3 | 7.5 |
| Example2 | F * | 23 | a | 20.3 | 11.5 | 1.16 | 79 | 91.4 | 71.0 | 71.9 | 29.2 | 18.1 | 15.9 | 9.4 |
| Example3 | E* | 23 | b | 5.0 more | 11.5 | 1.15 | 80 | 151 | 79.0 | 80.0 | 32.8 | 20.4 | 16.6 | 8.6 |
| Example4 | E* | 23 | c | 20.3 ± 5 | 11.5 | 1.15 | 79 | 112 | 74.4 | 75.1 | 38.7 | 25.1 | 21.7 | 15.0 |
| G* 1 | Toluene | 15 | d | 0 | 12.0 | 1.04 | 77 | 6.2 | — | — | — | — | — | — |

CWO: Composite tungsten oxide fine particle
a: a dispersant having an amino group, having an acid value of 20.3 mg KOH/g, and having a hydroxystearic acid skeleton.
b: a dispersant having an amino group, having an acid value of 5 mg KOH/g, and having a hydroxystearic acid skeleton partially modified with caprolactone.
c: a dispersant having an amino group, having an acid value of 20.3 mg KOH/g, and having a polylactone skeleton.
d: An acrylic dispersant having a carboxyl group.
A * = Physical property
B * = Specific gravity
C* = CWO dispersed particle size
D * = Visible light transmittance
E* = Sunflower oil
F * = Linseed oil
G* = Comparative example Next, in the same manner as in example 1, a dried film was obtained and the optical properties were measured.

Figure 4:
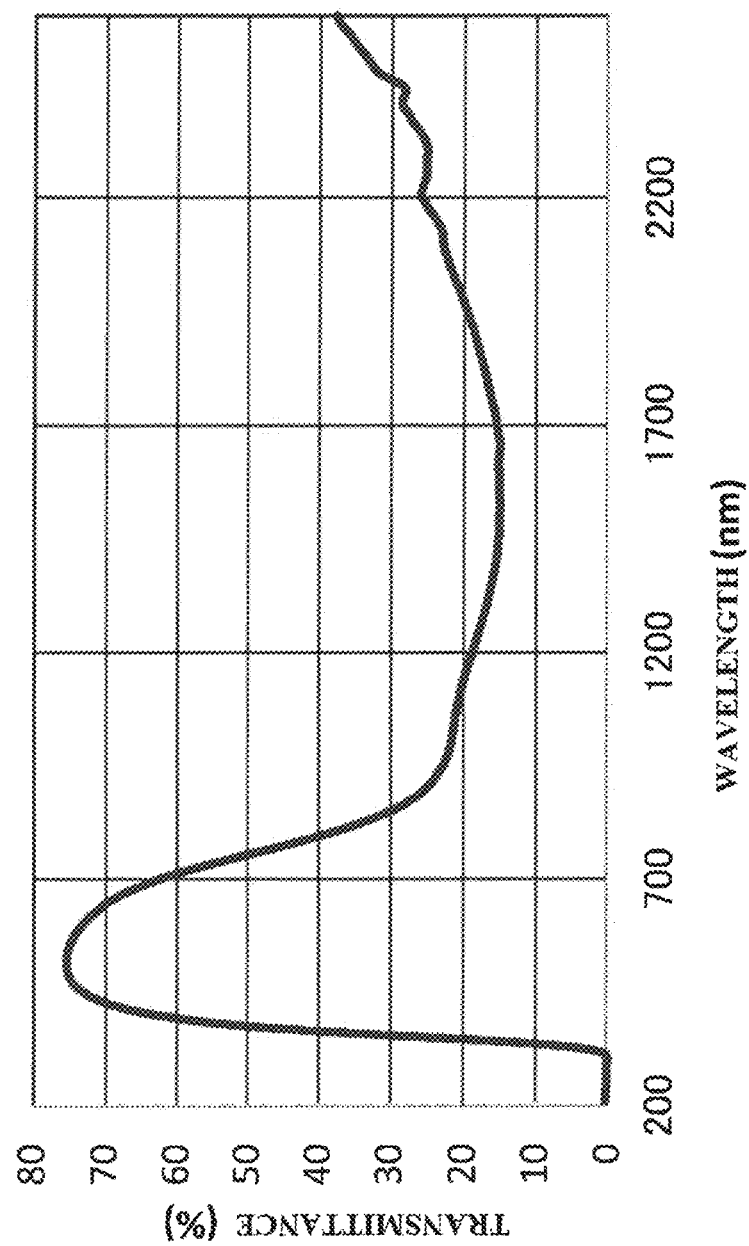
FIG. 4 is a light transmission profile of a dried film of a dispersion liquid D according to the present invention.

FIG. 4 is a light transmission profile of the dried film of the dispersion liquid D.

Comparative Example 1

As near infrared ray absorbing fine particles, 15.0 mass % of hexagonal $Cs_{0.33}WO_3$ which is the same composite tungsten oxide as in example 1, 12.0 mass % of a dispersant composed of an acrylic resin having no acid value (abbreviated as dispersant "d" hereafter), and 73.0 mass % of toluene were mixed, and pulverized and dispersed for 10 hours with a paint shaker containing 0.3 mmφ $ZrO_2$ beads,

The invention claimed is:

1. A near infrared absorbing fine particle dispersion liquid, comprising:
   a solvent selected from the group consisting of vegetable oils and vegetable oil-derived compounds;
   near infrared absorbing fine particles each having a dispersed particle size in the range of 1 nm to 200 nm, the near infrared absorbing fine particles being selected from the group consisting of:
      fine particles of a composite tungsten oxide expressed by $M_xW_yO_z$, in which:
         M is at least one element selected from the group consisting of H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I,
W is tungsten,
O is oxygen,
$0.001 \leq x/y \leq 1$, and
$2.2 \geq z/y \geq 3.0$, and
fine particles of a tungsten oxide having a Magneli phase expressed by a general formula $W_yO_z$, in which:
W is tungsten,
O is oxygen, and
$2.45 \leq z/y \leq 2.999$; and
30 to 200 parts by weight of a dispersant based on 100 parts by weight of the near infrared absorbing fine particles, the dispersant being soluble in the solvent and having a fatty acid in its structure,
wherein:
a concentration of the near infrared absorbing fine particles in the near infrared absorbing fine particle dispersion liquid is in the range of 10 mass % to 25 mass %, and
a viscosity of the near infrared absorbing fine particle dispersion liquid at 24° C. is 180 mPa·s or less, as measured using a vibration type viscometer.

2. The near infrared absorbing fine particle dispersion liquid according to claim 1, wherein an anchor portion of the dispersant has a secondary amino group, a tertiary amino group, or a quaternary ammonium group.

3. The near infrared absorbing fine particle dispersion liquid according to claim 1, wherein the dispersant has an acid value of 1 mg KOH/g or more.

4. The near infrared absorbing fine particle dispersion liquid according to claim 1, comprising the fine particles of a composite tungsten oxide, wherein the fine particles of the composite tungsten oxide have a hexagonal crystal structure or are composed of a hexagonal crystal structure.

5. The near infrared absorbing fine particle dispersion liquid according to claim 1, comprising the fine particles of a composite tungsten oxide, wherein a lattice constant of the fine particles of the composite tungsten oxide is 0.74060 nm or more and 0.74082 nm or less on the a-axis and 0.76106 nm or more and 0.76149 nm or less on the c-axis.

6. The near infrared absorbing fine particle dispersion liquid according to claim 1, wherein a surface of each near infrared absorbing fine particle is coated with a compound of comprising at least one element selected from the group consisting of Si, Ti, Al and Zr.

7. The near infrared absorbing fine particle dispersion liquid according to claim 1, wherein the solvent comprises a drying vegetable oil or a semi-drying vegetable oil.

8. A method for producing the near infrared absorbing fine particle dispersion liquid of claim 1, comprising:
mixing the near-infrared absorbing fine particles, the solvent and the dispersant; and
dispersing the mixture in a wet medium mill.

* * * * *